United States Patent [19]

Fulwyler

[11] 3,916,197
[45] Oct. 28, 1975

[54] METHOD AND APPARATUS FOR CLASSIFYING BIOLOGICAL CELLS
[75] Inventor: Mack J. Fulwyler, Los Alamos, N. Mex.
[73] Assignee: Particle Technology, Inc., Los Alamos, N. Mex.
[22] Filed: Oct. 18, 1974
[21] Appl. No.: 516,090

Related U.S. Application Data
[63] Continuation-in-part of Ser. No. 419,689, Nov. 28, 1973, abandoned.

[52] U.S. Cl. ............... 250/361; 250/304; 250/461; 250/575
[51] Int. Cl.² .................. G01T 1/20; G01N 21/38
[58] Field of Search ........... 250/304, 361, 362, 461, 250/575; 356/39

[56] References Cited
UNITED STATES PATENTS
3,062,963   11/1962   Douty ............................... 250/575
3,413,464   11/1968   Kamentsky ...................... 250/304
3,470,373   9/1969    Brewer et al. ..................... 250/362
3,497,690   2/1970    Wheeless, Jr. et al. ............ 250/304

Primary Examiner—Archie R. Borchelt
Attorney, Agent, or Firm—Silverman & Cass, Ltd.

[57] ABSTRACT

A method and apparatus for classifying biological cells wherein a cell is passed through a plurality of monochromatic beams of light generated by splitting a laser beam. The light may be absorbed or scattered by the cell or it may excite the cell to emit fluorescent light. The absorption scatter or fluorescence is detected and a signature for the cell is provided for classifying the cells and detecting abnormalities therein which are characterized by the detected response.

14 Claims, 2 Drawing Figures

METHOD AND APPARATUS FOR CLASSIFYING BIOLOGICAL CELLS

CROSS REFERENCE TO RELATED APPLICATIONS

This application is a Continuation-in-Part of Patent application Ser. No. 419,689 filed Nov. 28, 1973, now abandoned.

BACKGROUND OF THE INVENTION

This invention relates to a method and apparatus for the rapid differential identification analysis of microbiological cellular systems and the components thereof and is especially adapted for medical diagnosis and pathological identification of microbic diseases and tissue disorders.

Although the invention is described in the context of classifying body tissue cells and particularly in connection with detection of abnormal cells detected in the female genital track, it should be understood that the invention is capable of classifying any type of cell that can be stained to fluoresce at one or more wavelengths or bands of wavelengths, called secondary fluorescence, or spontaneously fluoresce called primary fluorescence, at one or more separate wavelengths. The invention also is capable of classifying cells having particular absorption or scatter characteristics as well as particular fluorescent characteristics. In addition to aiding in the detection and classification of cellular abnormality, the invention may have application in many other fields such as, immuno-fluorescence, malaria studies, virus research, tissue cultural research and determining characteristic fluorescent fading curves of drugs, etc.

All tissues are composed of cells, the cell being the basic living unit of animal and plant matter. Many body organs are composed of or lined by epithelial tissue. As a result of continuous growth and replacement, the most superficial cells of an epithelium are constantly shed and replaced by younger cells in a phenomenon known as spontaneous exfoliation. The exfoliated cells are found in body fluids such as secretions from the female genital track, gastric fluid, sputum, or in various body cavities such as pleural fluid, peritoneal fluid, urine, cerebrospinal fluids, or washings from epithelial surfaces. In addition, spontaneously exfoliated cells can be supplemented by cells obtained directly from certain organs by the use of suitable instruments. Such cells may be employed for detection and diagnosis of the various pathological conditions.

The detection of carcinoma or cancer in the female genital track is a primary example of the use of human cell interpretation called diagnostic cytology. Exfoliated cells which accumulate in the vagina together with cells scraped from the uterine cervix can provide the pathologist information for detecting carcinoma with high reliability rates. Of course, early detection of carcinoma is important for well recognized reasons.

In prior art procedures, collected pathological material from the vagina and/or uterine cervix and/or uterine cavity is smeared on glass slides and fixed to preserve morphologic and chemical structure. The specimen is then subjected to an elaborate staining procedure using (Papanicolaou Stain) in a suitable laboratory. After staining, the slides are scanned under a microscope by cytotechnicians trained to identify normal and abnormal cells. Any slides that show an abnormal morphology and/or staining reaction are referred to the pathologist for final interpretation. The criteria used by cytotechnicians to distinguish normal from abnormal smears are quite subtle. Generally a well trained cytotechnician will screen approximately 50 cases a day.

Successful application of this cancer detection technique at an early and curable stage of the disease makes it highly desirable to extend the technique to a mass examination of the human population. However, if this smear test was to be conducted on all women on a regular basis to assure early detection of carcinoma, an excessively large number of cytotechnicians and pathologists would be needed to examine the cell samples. Furthermore, since the great majority of smears could be expected to be normal, it is apparent that some sort of automatic apparatus would be of significant value in screening out all obviously normal smears, leaving questionable and abnormal ones for further examination by cytotechnicians and pathologists.

It has been found that a relatively constant relationship exists between cell deoxyribonueleic acid called DNA, content and the ribonucleic acid, called RNA, content and cell size in the normal cell as compared to various stages in carcinogenesis. Cancer cells in general have an abnormal amount of nucleic acid with an excess of DNA probably due to an abnormal mitotic process during rapid cell proliferation. Since RNA is necessary for protein synthesis, an accumulation of RNA is also frequently observed. It is also known that malignant cells may have very little cytoplasm and, therefore, a relatively small amount of RNA. Thus, an increase in DNA may be offset by a reduction in RNA. Accordingly, the amount of RNA and DNA must be established independently. Furthermore, absorption measurements as generally made in the past provide an indication of combined amounts of RNA and DNA and, accordingly, provide inadequate data for adequate malignant cell separation. Also, in the past, devices have been constructed whereby the stained cells are excited by a variety of wavelengths of light.

Various automatic equipment has been built to monitor cells based chiefly upon differences in cell area or size along with total cell radiation absorption or cell optical density. The reliability of such equipment has proven to be extremely poor in separating the spectrum of cells under consideration.

An automatic device for distinguishing the DNA content and RNA content of a cell by measuring the size and primary and secondary fluorescent characteristics of the cell is described in U.S. Pat. No. 3,497,690. In this patented device, the sample cells are illuminated by light comprised of a plurality of wavelengths and the secondary emission caused by the exciting wavelengths of light are measured. Thus apparatus does not have the discriminating ability to distinguish the secondary emission excited by specific wavelengths of the light because the cells are illuminated by light comprised of a plurality of wavelengths.

In U.S. Pat. No. 3,470,373, apparatus is described whereby cells are illuminated by individual wavelengths of light. Although the apparatus is capable of distinguishing secondary fluorescence by the excitation of illumination, it is not capable of being utilized in a flow-through system wherein cells are continuously flowing through the measuring system instead of preserved on a slide. A flow-through system would provide continuous signals to an analyzing computer to indicate the parameters being measured and also, provide a complete analysis of the sample cells while allowing more samples to be analyzed within a given period of time.

Lasers are employed in such apparatus in order to produce a single beam of monochromatic light for illuminating the cells in the system, causing the cells to fluoresce. If a number of monochromatic coherent beams are required, they are produced by separate lasers. Using a number of lasers substantially increases the apparatus cost.

Spurious wavelengths of light are generated by a laser in addition to the desired monochromatic coherent wavelengths. These spurious wavelengths can be relatively high in intensity and are generally removed by use of filters in order to eliminate undesired responses.

SUMMARY OF THE INVENTION

A method and apparatus for classifying particles or cells derived from biological material wherein the particles develop a characteristic response of absorption, scatter or fluorescence in response to light beams. The method comprises the steps of splitting a laser beam containing both spurious and desired wavelengths into a plurality of spatially separated beams of light each having a different characteristic, individually transporting the sample cells through each of said beams in sequence for producing the characteristic response produced by each of said beams and detecting the response for analyzing and classifying the cells. The invention provides apparatus capable of practicing this method efficiently and reliably.

DESCRIPTION OF THE PREFERRED EMBODIMENT

Figure 1:
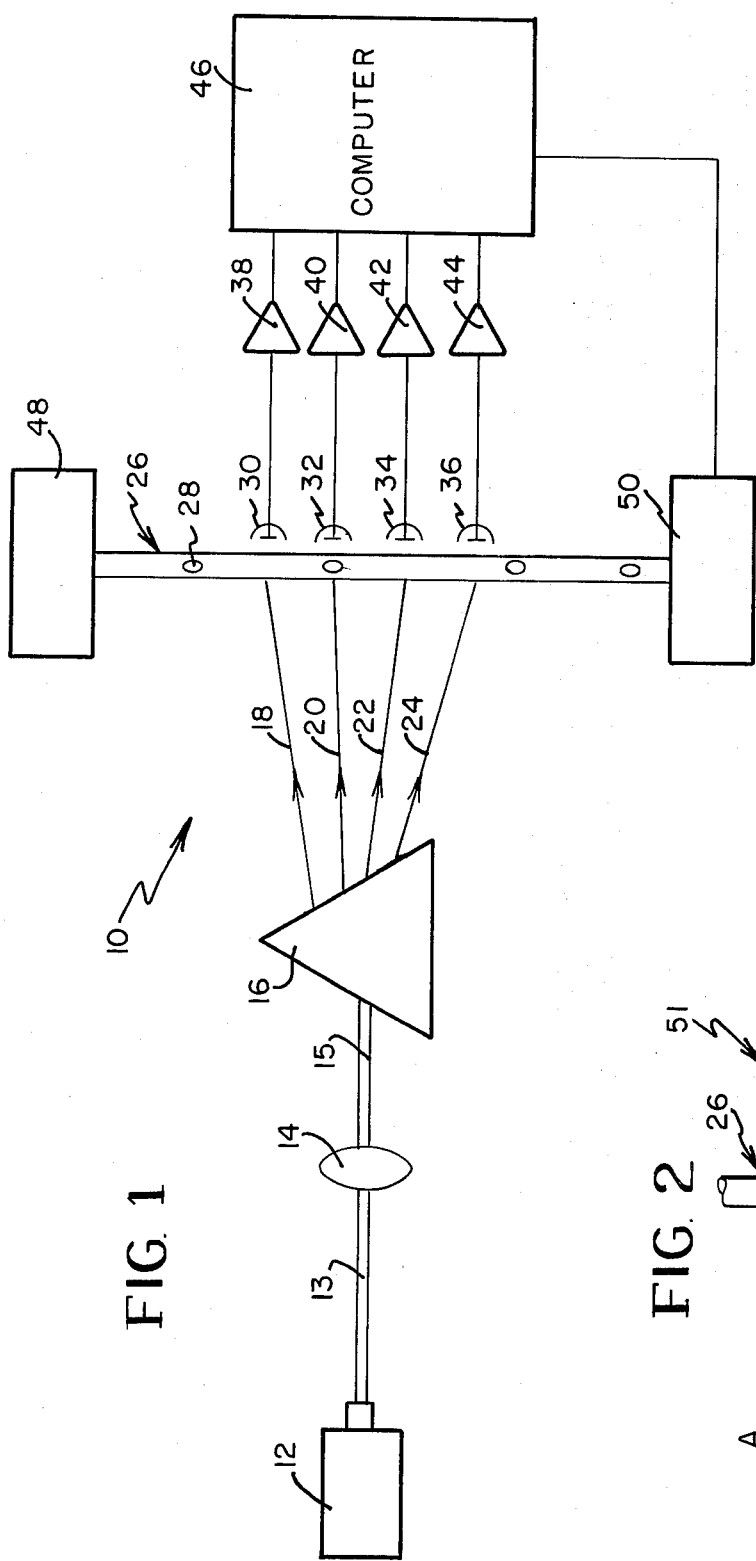
FIG. 1 is a block diagram showing the method and apparatus embodying the invention.

Before describing the invention in detail, preliminary data is useful to know. A mixed population of cells such as human leukocytes can be stained differentially. That is, one type of cell will take up a specific fluorescent stain with a characteristic excitation and emission spectrum. By using several such stains, in combinations, a mixed population of cells can be stained so that the subpopulations can be uniquely distinguished. For example, it is known that Acridine Orange has an excitation maxima at the wavelengths of 490 and 270 nanometers. Cells stained with Acridine Orange and excited by light having 490 nanometers or 270 nanometers in wavelength will secondarily fluoresce at an emission maxima of 520 nanometers wavelength. It is also known that Auramine O when excited by light of 430 nanometers in wavelengths will emit fluorescent light at 530 nanometers in wavelength.

It is known that certain cells will emit fluorescent radiation when excited by light of certain wavelengths, this phenomena being known as primary fluorescence. Therefore, such cells need not be stained in order to emit fluorescent radiation for reasons believed to be attributable to some constituent of the cell. For instance, when an unstained fungus cell such as "Tinea capitis" found in eye infections is excited by light of approximately 360 nanometers wavelength, the cell will fluoresce. Accordingly, such a cell exhibiting primary fluorescence can be positively detected and identified by this invention. Other cells such as Erythrocytes, Chloroplasts, and Yeast cells when excited by light of 400, 405–436, and 270–300 nanometers wavelength respectively will exhibit primary fluorescence which can be analyzed for classifying the cells.

It also is known that certain cells when stained or unstained will absorb certain wavelengths of light, or will absorb certain wavelengths more completely than others. Certain cells when stained or unstained can cause particular wavelengths of light to exhibit particular scatter characteristics.

Accordingly, the word "cell" or its plural form when used hereinafter without classification, is intended to refer to a biological cell which is either stained or unstained. Further, the word "fluorescence" when used hereinafter without classification is intended to refer to both primary and secondary fluorescence.

The cells as described in this description of the preferred embodiment will be considered stained by Euchrysine, Acridine Orange, a fluorochrome or Auramin O. The stained cell is irradiated sequentially by passing the cell through beams of light of different wavelengths. The fluorochromes attach to specific components of the cells and the cell is excited to emit light by secondary fluorescence. The wavelength emitted and the amount emitted provides information relative to the amount of RNA and DNA present in the cell.

Although the method and apparatus disclosed in the present application is described as employing Euchrysine or Acridine Orange or Auramine O stained cells, it is to be understood that other suitable fluorochromes may be used. Furthermore, the method and apparatus described herein can also function to identify cells that, without prior staining, exhibit primary fluorescent characteristics at a plurality of separate wavelengths or exhibit unique scatter and/or absorption characteristics.

Referring to FIG. 1, apparatus for practicing the method of the invention is generally designated by the reference character 10. A laser 12 is shown providing a light beam of coherent light 13.

Although laser 12 functions primarily to develop a monochromatic light beam, it develops a number of spurious wavelengths of relatively high intensity. The light beam 13, containing all the wavelengths, is shaped by beam shaping lens 14 which directs a shaped beam 15 containing all the wavelengths to a prism 16. The prism 16 provides means for separating the shaped beam of light 15 from lens 14 into the separate beams of monochromatic light 18 through 24 corresponding to the wavelengths generated by the laser. The beams 18 through 24 emerge at divergent angles from the prism 16. Laser 12 can be an argon-ion laser providing wavelengths of light of 514 nanometers (nm), 502 nm, 496.5 nm, 488 nm, 476.5 nm and 458 nm.

The light beams 18 through 24 are directed towards a flow cell or tube 26. A flow cell 26 is provided to transport sample cell 28 through the spatially separated beams of light 18 through 24. Since the light beams are separated, a cell will be illuminated by no more than one beam of light at any one designated interval of time. Where the cells are differentially stained with fluorochromes, the impinging light beams excite the cells, causing them to emit secondary fluorescence. Such secondary fluorescence is arranged to be detected by photocells 30 through 36 which are coupled to amplifiers 38 through 44 respectively to provide signals thereto. The output of the amplifiers, in turn, is coupled to a computer 46. Photocells 30 through 36 can also be provided with filters well known in the art to detect primary fluorescence of the cells at a plurality of different wavelengths. Photocells 30 through 36 can also be employed to measure light absorption or scatter rather than fluorescence.

Means for supplying the cells to the flow cell 26 is shown by block 48. Such means is well known in the art and any one of a number of devices can be used. Included in this means could be a Coulter type particle analyzing device as described in U.S. Pat. No. 2,656,508. In Applicant's U.S. Pat. No. 3,380,584, a particle separator is described wherein the concentration of blood cells in a saline solution is maintained so that individual particles will pass the light sensing region of the particle separator. In this patent application, such a particle separator would be used wherein the spatial arrangement of photocells 30 through 36 would circumscribe the light sensing region. Orientation of the sample cells such that they traverse the beams 18 through 24 orthogonally can be accomplished by well known means, such as by sheath flow techniques referred to in U.S. Pat. No. 3,380,584.

Means for receiving the cells from the flow cell 26 after the cells have passed through the beams of light 18 through 24 is designated by reference character 50. Such a device can be a particle separator as described in Applicant's U.S. Pat. No. 3,380,584, where the cells are formed into droplets that subsequently are charged proportional to a measured characteristic of the cells. This measured characteristic could be represented by a voltage which is a function of the cell's signature which will be described subsequently. The charged droplet is then passed through a static field whereby droplets with different charges will be deflected into different containers for further analysis.

In operation, beam 18 can be monochromatic light of approximately 490 nanometers in wavelength. In this example, cell 28 could be stained with Acridine Orange which, when passed through beam 18, will emit secondary fluorescent light having a wavelength of 520 nanometers. The secondary fluorescence emitted by cell 28 is detected by photodetector 30 amplified by amplifier 38 and coupled to computer 46. Due to the motion of the cell 28 in flow tube 26, within a short period of time, the cell 28 will pass through beam 20 which, in this example, is chosen to be light having a wavelength of approximately 430 nanometers. If cell 28 also is stained with Auramin O, the cell will secondary fluoresce at a wavelength of light of approximately 530 nanometers. The secondary fluorescence is detected by photodetector 32, amplified by amplifier 40 and coupled to computer 46. If, for example, the secondary fluorescence from cell 28, as excited by beam 18, produces a pulse of approximately 2 volts at the output of amplifier 38 and also produces a pulse of 10 volts as the cell passes beam 20 at the output of amplifier 40, a ratio can be struck between the outputs of amplifier 40 and amplifier 38 by computer 46, to wit, a ratio of 10 over 2 or 5. Thus, emission spectrum analysis on the outputs of amplifiers 38 and 40 can be performed electronically by computer 46 to provide a means for detecting abnormalities in the cell correlated to the ratios struck. Of course, the same analysis can be performed using light scatter or light absorption detectors and their respective outputs.

In a similar manner, as the cell passes beams 22 and 24, two additional pulses are produced at the output of the respective amplifiers 42 and 44. Electronic ratios can be performed upon all four of the outputs of the amplifiers 38 through 44 to provide an output which can be used to determine abnormality of the cells passing the photodetectors 30 through 36. Further, by way of example, if the ratio struck indicated that an abnormal cell had just passed detectors 30 to 36, i.e., an indication of excessive DNA or RNA, the location of that cell in flow tube 26 would be known and a signal could be coupled from the computer 46 to receiving means 50 to tag or separate the cell for further study. For instance, receiving means 50 could be that portion of the particle separator described U.S. Pat. No. 3,380,584 which could function to separate the abnormal cell into a proper collection container. As described in said U.S. Pat. No. 3,380,584, the cell would be formed into a droplet and the droplet charged and suitably directed to a container for subsequent observation.

Figure 2:
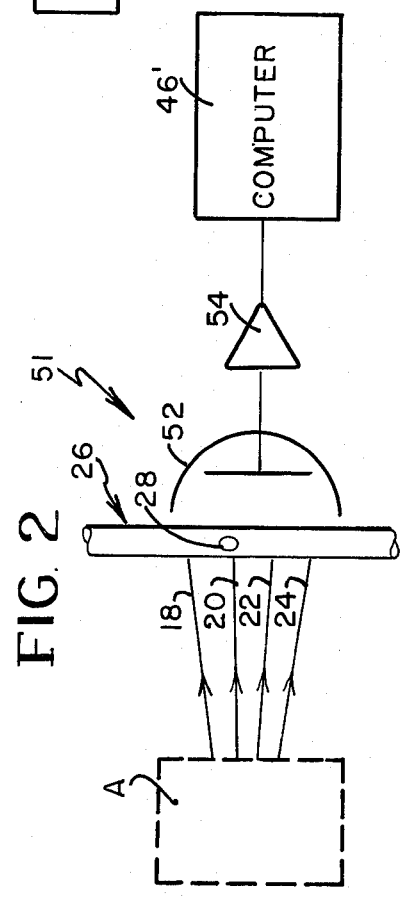
FIG. 2 is a modified embodiment of the invention to be used in the system described in FIG. 1.

Signals produced by the photodetectors 30 through 36, as cell 28 passes through beams 18 through 24, can be supplemented by the device designated 51 in FIG. 2. The broken rectangle A represents the components 12 through 16 identified in FIG. 1. The flow tube 26 can be the same as referred to in FIG. 1. Now, as seen in FIG. 2, the cell 28 is shown passing through the flow tube 26 and thereby, through beams 18 through 24. However, here, a single photodetector 52 is positioned additionally to detect the secondary fluorescence as the cell 28 passes through the beams. The output of photodetector 52 is coupled to amplifier 54 which is coupled to computer 46'. The signal produced as the cell 28 passes through the plurality of the light beams 18 through 24 is coupled to computer 46'. A signature of cell 28 is thereby provided as it is excited by the particular wavelengths of light comprising beams 18 through 24.

It is intended that the cell's signature be comprised of a series of pulses or a pulse train representative of the presence or absence of fluorescent light detected by photocells 30 through 36. The amplitude of the pulses and the presence or absence of a pulse in the pulse train can be detected by computer 46 and this information processed for subsequent determination of abnormalities in the cell. The techniques of such analysis are very well known in the art and a computer for such an analysis is described in U.S. Pat. No. 3,497,690. It should be understood that any means of signature analysis by classification and identification to determine the abnormality of a cell's primary and secondary fluorescence can be used.

The above described invention has the advantage of providing a flow-through system wherein a cell is sequentially excited by a plurality of monochromatic spatially separated beams of light produced by separation of the wavelengths produced by a single laser. The separation and use of the wavelengths of a single laser beam has not been heretofore considered feasible. The plurality of beams cause the cells in the embodiment to fluoresce and provide more characteristics or parameters for distinguishing cell abnormalities than heretofore achieved. There is provided a laser for generating the beams and apparatus to detect the fluorescent parameters for subsequent analysis to determine cell abnormalities. This generated information by means of the invention enables greater success in differentiating between normal and abnormal cells, as well as the ability accurately and reliably to detect different types of abnormalities in sample cells.

What is desired to be secured by Letters Patent of the United States is:

1. A method for classifying biological cells which respond to light beams by one of light absorption, light scatter or fluorescent radiation comprising the steps of:
   splitting a laser beam containing spurious and desired wavelengths into spatially separated beams of light having different characteristics;
   transporting said cells individually through said spatially separated beams of light to produce the response from each; and
   selectively measuring the response of the individual cells passing through said light beams to detect the same for classification purposes.

2. The method as claimed in claim 1 which includes the step of splitting said laser beam into beams of monochromatic light.

3. The method as claimed in claim 1 which includes the step of analyzing the measured response of the cells to detect abnormalities therein.

4. The method as claimed in claim 3 wherein the step of analyzing the measured response includes the step of comparing the measured response of one cell as it passes one of said plurality of beams with the measured response of the cell as it passes another one of said beams.

5. The method as claimed in claim 1 in which the classification of cells is conducted in a flow-through sequence without interruption.

6. The method as claimed in claim 1 which includes the steps of:
   providing signals representative of the measured response of the individual cells passing through said light beams;
   performing a ratio on at least two of said signals; and
   analyzing said ratio to detect cell abnormalities correlated to such ratio.

7. The method as claimed in claim 1 which includes the step of:
   providing a signature for each of said cells, said signature comprising signals representative of the response of each of said cells as said cells pass individually through each of said spatially separated beams of light.

8. Apparatus for classifying biological cells in a fluid suspension in which the cells respond to light beams by one of light absorption, light scatter or fluorescent radiation comprising:
   a laser for supplying a beam of coherent light comprising a plurality of wavelengths;
   means for separating said plurality of wavelengths of light into a plurality of beams each having different wavelength characteristics;
   transport means for flowing said cells through said plurality of beams; and
   means for automatically measuring the response of the cells as they pass through said plurality of beams.

9. Apparatus as claimed in claim 8 wherein said means for separating are a prism.

10. Apparatus as claimed in claim 8 wherein said particle transport means includes:
    a flow cell through which said cells are transported to pass through said plurality of beams;
    means for supplying said cells to said flow cells; and
    means for accumulating said cells after passing through said flow cell.

11. Apparatus as claimed in claim 10 wherein said means for accumulating are a particle separator.

12. Apparatus as claimed in claim 8 which includes means for analyzing the measured response of the cells to determine abnormalities existing therein.

13. Apparatus as claimed in claim 12 wherein said automatic measuring means includes a photodetector positioned to detect the response of the cells to each of said beams.

14. Apparatus as claimed in claim 12 wherein said automatic measuring means includes a plurality of photodetectors each positioned to detect the response of the cell as the cell respectively is passed through said plurality of beams.

* * * * *